United States Patent [19]

Groenendaal et al.

[11] 3,947,547

[45] Mar. 30, 1976

[54] PROCESS FOR REDUCING TOTAL SULFUR CONTENT OF CLAUS OFF-GASES

[75] Inventors: Willem Groenendaal; Heinz-Gerhard A. Kock; Philippus Loof, all of The Hague, Netherlands

[73] Assignee: Shell Oil Company, Houston, Tex.

[22] Filed: Dec. 13, 1973

[21] Appl. No.: 424,251

[30] Foreign Application Priority Data
Dec. 15, 1972 United Kingdom............... 58026/72
July 3, 1973 Netherlands....................... 7309230

[52] U.S. Cl. ............ 423/242; 423/564; 423/573 G; 423/230
[51] Int. Cl.[2].................... C01B 17/00; C01B 17/02
[58] Field of Search ............................ 423/242–244, 423/573 G, 574, 576, 230, 564

[56] References Cited
UNITED STATES PATENTS

| | | | |
|---|---|---|---|
| 3,615,219 | 10/1971 | Budininkas et al. .................. | 423/570 |
| 3,752,887 | 8/1973 | Bravon................................ | 423/244 |
| 3,794,710 | 2/1974 | Merrill................................ | 423/573 |

*Primary Examiner*—Oscar R. Vertiz
*Assistant Examiner*—Gregory A. Heller

[57] ABSTRACT

An improved Claus off-gas treating process is disclosed where sulfur dioxide and other convertible sulfur compounds present in the off-gas are catalytically reduced to hydrogen sulfide by mixing said off-gases with the hot gaseous product of the combustion of a carbonaceous fuel with an oxygen-containing gas in a line burner to heat the off-gases to a temperature above 175°C and passing the heated gaseous product together with a hydrogen-containing gas over a reduction catalyst thereby converting substantially all of the sulfur dioxide and other convertible sulfur compounds present to hydrogen sulfide which is subsequently removed with an absorbent or absorbent for hydrogen sulfide. The improvement comprises introducing hydrogen-containing gas required in the catalytic reduction step directly into the line burner at a point where the temperature of the gaseous product of combustion is sufficiently high to support spontaneous combustion between the hydrogen so introduced and any excess oxygen which may be present in the combustion product.

3 Claims, 2 Drawing Figures

PROCESS FOR REDUCING TOTAL SULFUR CONTENT OF CLAUS OFF-GASES

BACKGROUND OF THE INVENTION

The invention relates to an improved process for reducing the total sulfur content of Claus off-gases.

In a typical Claus process elemental sulfur is manufactured from hydrogen sulfide by partial oxidation of the hydrogen sulfide to sulfur dioxide with oxygen or an oxygen-containing gas such as air, followed by reaction of the sulfur dioxide formed with the remaining part of the hydrogen sulfide in the presence of a catalyst. This process is commonly used both at refineries and for working-up hydrogen sulfide recovered from natural gas. It is generally carried out in a plant comprising a combustion chamber followed by one or more catalyst beds having condensers arranged in between in which the reaction products are cooled and the separated liquid sulfur recovered. The various steps of the process can be represented by the following equations:

$$2H_2S + 3O_2 \rightarrow 2H_2O + 2SO_2 \qquad (1)$$

$$4H_2S + 2SO_2 \rightleftarrows 4H_2O + \frac{6}{x}S_x \qquad (2)$$

while the total reaction is represented by equation (3):

$$6H_2S + 3O_2 \rightleftarrows 6H_2O + \frac{6}{x}S_x \qquad (3).$$

For temperatures below 500°C, $x$ in the above equation has a value of 8.

In actual practice, the yield of recovered elemental sulfur is not completely quantitative resulting in a certain quantity of unreacted hydrogen sulfide and sulfur dioxide remaining in the effluent gases from the Claus process. These gases which emanate from the Claus process at temperatures typically in the 150°C range are normally burned in an incinerator whereby the hydrogen sulfide is converted to sulfur dioxide which is subsequently discharged to the atmosphere through a stack. The quantity of sulfur recovered depends to a large extent on the total number of catalyst beds used in the Claus process. When three beds are usually generally about 98 percent of the sulfur can be recovered.

Because of increasingly stringent limitations on sulfur emissions to the atmosphere, and to increase sulfur yields, a considerable amount of effort has been devoted recently to reducing the sulfur content of Claus plant off-gases. Among the more desirable processes developed for this purpose are those based on the catalytic reduction of the sulfur oxides contained in the off-gases to hydrogen sulfide which is subsequently removed with the use of a solid adsorbent or liquid absorbent for hydrogen sulfide. Generally, the reduction of the off-gases is effected by mixing the gases with a hydrogen and/or carbon monoxidecontaining reducing gas in the presence of a metal catalyst at elevated temperatures, e.g., above 175°C. Such catalytic hydrogenation processes are described, for example in co-assigned U.S. application Ser. No. 326,916 filed Jan. 26, 1973 and in U.S. Pat. No. 3,752,877 to Beavon.

Since a temperature differential exists between the temperature of the off-gases emanating from the Claus process, said gases generally becoming available at temperatures of approximately 150°C, and the optimum temperature for catalytic reduction, preferred temperatures being above 175°C, it is generally required that these off-gases be heated prior to catalytic reduction. To heat the Claus off-gases to a temperature in excess of 175°C a direct heating or line burner is conventionally employed. By this is meant a burner in which gases are combusted and in which the combustion products are subsequently mixed with the gas to be heated; heating thus takes place by direct contact. Such a line burner may very suitably comprise a burner section and a mixing section. In this line burner, a carbonaceous fuel— e.g., a hydrocarbon such as gas-oil, naphtha, coal fines, etc.— is combusted with an oxygen-containing gas in the burner section and the hot gases are passed to the mixing section, into which the Claus off-gases, which are to be heated by the said hot gases, are also introduced. The oxygen-containing gas is introduced into the burner section in a stoichiometric proportion in relation to the fuel, so that no free oxygen is present in the hot gases which are passed to the reducing catalyst. With this method of heating Claus off-gases there is a potential hazard in connection with the consecutive addition of hydrogen-containing gas to the reduction catalyst bed or to the supply line thereto of the heated Claus off-gases. This potential hazard is due to the fact that the heated Claus off-gases leaving the direct heating burner may still contain some oxygen, for example, owing to incorrect regulation of or upsets in the oxygen and/or fuel supply. This situation creates the risk of explosions, which can occur if the oxygen-containing gases and the hydrogen-containing gases come into contact. The present invention provides a process in which the explosion hazard is eliminated.

SUMMARY OF THE INVENTION

It has now been found that the afore-mentioned potential hazard from explosion in Claus off-gas treating processes employing line burners to heat the Claus off-gases prior to catalytic reduction can be substantially eliminated if hydrogen-containing gas, in a quantity which is required to convert at least 10 percent of the oxygen in the oxygen-containing gas supplied to the line burner, is introduced directly into the line burner at a point where the temperature of the gaseous product of combustion is sufficiently high to support spontaneous combustion between the hydrogen so introduced and any excess oxygen which may be present in the combustion product. Accordingly, the instant invention provides an improved process for reducing the total sulfur content of off-gases from a Claus process wherein the sulfur dioxide-containing off-gases are heated to a temperature in excess of about 175°C by mixing with the hot gaseous product of the combustion of a carbonaceous fuel with an oxygen-containing gas in a line burner, and the Claus off-gases, so heated, are passed together with hydrogen over a reduction catalyst at a temperature above 175°C to reduce the sulfur dioxide and other convertible sulfur compounds present to hydrogen sulfide followed by removal of the hydrogen sulfide from the gaseous stream by adsorption on an absorbent or adsorbent for hydrogen sulfide; characterized in that hydrogen-containing gas is introduced directly into the line burner in the quantity and manner described above. In a preferred aspect of this invention all of the hydrogen required for catalytic reduction is introduced directly into the line burner in the manner described. In a further preferred aspect of this invention the introduction of the hydrogencontaining gas into the line burner is affected by distributing it around the flame formed by the combustion of the carbonaceous fuel and the oxygen-containing gas.

The greatest advantage of introducing the hydrogen-containing gas directly into the direct heating burner in the manner described is considered to be the fact that, if for any reason, excess free oxygen is still present in the combustion gases after the combustion of the fuel, said excess will spontaneously react with the hydrogen in the direct heating burner. Consequently, the off-gases of the direct heating burner cannot contain any oxygen and there is therefore no explosion hazard. In addition, the present invention facilitates the control system needed to ensure stoichiometric combustion of the fuel and oxygen-containing gas in the line burner since the accuracy to which the system is required to operate is no longer of such critical importance with regard to safety because the risk of an explosion occuring in the reduction unit or lines leading thereto between free oxygen and hydrogen-containing gas is substantially eliminated. It is, of course, still desirable to accurately control the amounts of fuel and oxygencontaining gas in order to maintain substantially stoichiometric combustion from the point of view of operating efficiency and the minimization of hydrogen consumption.

THE DRAWINGS

The invention will be described in greater detail with reference to the accompanying drawings. These drawings which illustrate the manner in which the hydrogen-containing gas is introduced into the line burner employed in the process of the invention are intended to be illustrative rather than limiting on its scope.

FIGS. 1 and 2 are diagrammatic representations of partial cross-sections of two types of line burners which may be suitably used in the improved process of the invention.

DESCRIPTION OF THE PREFERRED EMBODIMENTS

Figure 1:
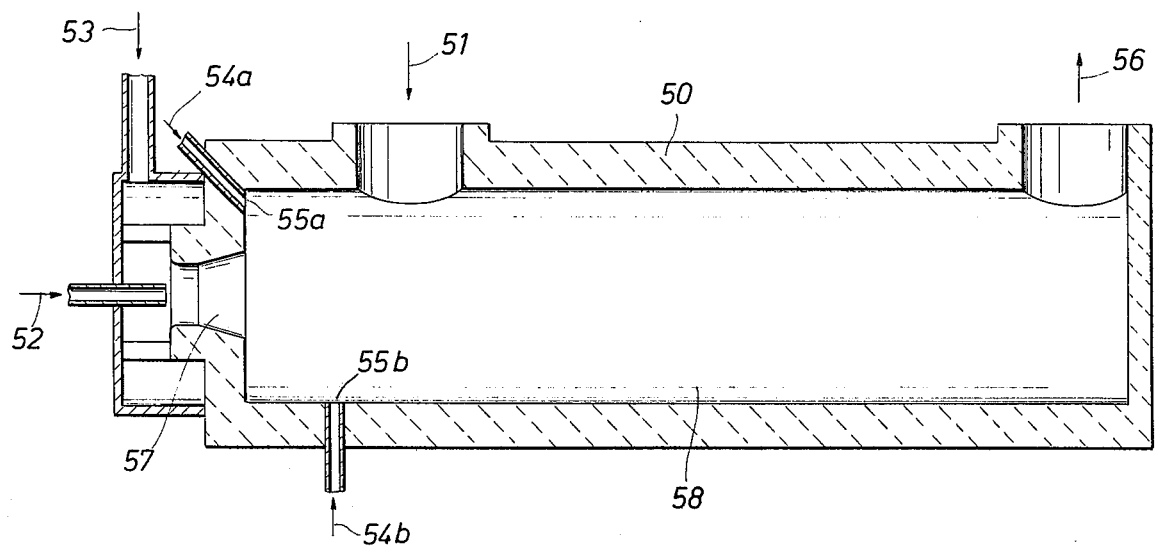

The hydrogen-containing gas must be introduced into the process in a quantity which is sufficiently large to reduce to hydrogen sulfide all the sulfur dioxide and other reducible sulfur compounds in the Claus off-gases. An excess of hydrogen-containing gas is preferably present. Moreover, it is preferred that all the hydrogen-containing gas should be introduced into the line burner. This has the advantage that no further supply points for hydrogen-containing gas need to be present and furthermore it increases the safety margin in the line burner with regard to the quantity of oxygen which can be present therein without an explosion hazard arising in the system.

It is not necessary, however, for all the hydrogen-containing gas to be supplied to the line burner. Some of this gas may, for example, be supplied to the line burner and the rest directly to the reduction catalyst bed or to the supply line of the heated Claus off-gas to the said catalyst bed. The quantity of hydrogen-containing gas which is supplied directly to the line burner, however, should not fall below a certain limit. This limit is formed by that quantity of hydrogen-containing gas which is required to burn the greatest quantity of oxygen which can be reasonably expected in the line burner as a result of incorrect regulation or proportioning of the quantity of fuel and/or oxygen-containing gas. The minimum quantity of hydrogen-containing gas thus depends essentially on the accuracy of the control system of the respective supplies. In general, at least that quantity of hydrogen-containing gas is supplied directly to the line burner which is required to convert at least 10 percent of the oxygen in that oxygen-containing gas supplied to the line burner.

The hydrogen-containing gas may very suitably be town gas, water gas, synthesis gas, off-gas of a catalytic-reforming unit, the gas produced in a hydrogen plant or the gas obtained from a working-up unit for saturated crude gases from petroleum. Substantially pure hydrogen is also eminently suitable. Preferably, the hydrogen-containing gas contains at least 20 percent by volume of pure hydrogen.

The hydrogen-containing gas may be introduced into the line burner at any point where the temperature is sufficiently high to ensure spontaneous combustion with any free oxygen present. In order to be sure that all the free oxygen present, if any, in the combustion gases of the direct heating burner is spontaneously converted when it comes into contact with hydrogen, it is preferred to introduce the hydrogen-containing gas into the line burner at a point where the temperature of the gases in the line burner is at least 500°C and preferably at least 600°C.

According to a preferred embodiment of the present invention, the hydrogen-containing gas is introduced into the line burner by dividing it around the flame which is formed by the combustion of the fuel and the oxygen-containing gas. In this way the hydrogen-containing gas is not only introduced into the direct heating burner at a point where the temperature is in excess of 500°C, but good distribution of the hydrogen in the direct heating burner is also ensured. Spontaneous combustion of the hydrogen-containing gas by any free oxygen present is consequently certain. Preferably, the hydrogen-containing gas is introduced around the flame by means of one or more nozzles.

The introduction point of the Claus off-gases into the mixing section of the line burner is not critical. In order to ensure that no combustion of sulfur compounds in the Claus off-gases takes place in the line burner, it is preferred to introduce said off-gases at a point where the combustion of the fuel (and possibly some hydrogen) is complete, i.e., that there is no more free oxygen present in the combustion mixture.

The quantity of Claus off-gases which can be introduced into the mixing section of the line burner is dependent, among other things, on the combustion heat of the fuel, the temperature of said off-gases and the temperature to which the off-gases have to be heated. In general, the molar ratio of the Claus off-gases supplied to the line burner and the combustion gases formed by combustion with an oxygen-containing gas in the line burner will preferably, be between 4:1 and 50:1.

After being heated and combined with part, or preferably all, of the hydrogen-containing gas required for catalytic reduction in the line burner, the Claus off-gases are passed into the catalytic reduction unit wherein reduction of sulfur dioxide and other sulfur compounds convertible to hydrogen sulfide is effected at a temperature above 175°C. The reduction is suitably carried out at a temperature as low as 180°C or at a temperature as high as 650°C with temperatures as low as about 200°C or as high as about 500°C being preferred. Preferably atmospheric pressure is used in the reduction but slightly elevated pressures can also be employed if desired. The hourly space velocity applied during the reduction is suitably 500 to 10,000 Nl of Claus off-gas per liter of catalyst per hour.

The reduction is suitably effected in the presence of a Group VI and/or Group VIII metal catalyst. Such catalysts include those containing molybdenum, tungsten and/or chromium as the Group VI metal, and/or preferably a metal from the iron group, such as cobalt, nickel and/or iron as the Group VIII metal.

Suitable reduction catalysts also include rhenium-containing catalysts, optionally combined with a Group VI and/or Group VIII metal. The rhenium may be present as a metallic element or in the form of an oxide or sulfide.

The inorganic oxide carrier may be alumina, silica, magnesia, boria, thoria, zirconia or a mixture of two or more of these compounds. Particularly preferred reduction catalysts for use in the process according to the invention are $Ni/Mo/Al_2O_3$, and $Co/Mo/Al_2O_3$.

The Group Vi and/or group VIII metal catalyst is preferably used in the sulfided form. Sulfidation may be effected in advance by means of a suitable sulfiding agent such as a mixture of hydrogen and hydrogen sulfide containing 10–15 percent by volume of $H_2S$. However, it is also possible to sulfide the catalyst in situ by means of the Claus off-gases themselves.

The treated off-gases from the catalytic reduction are subsequently contacted with an adsorbent or absorbent for the removal of hydrogen sulfide. Any conventional agents which chemically or physically bind the hydrogen sulfide can be used for this purpose. These agents may be subdivided into solid and liquid agents. If a liquid absorbent is employed, contacting is preferably effected at a temperature below 70°C and the water present after condensation is first removed from the off-gases.

A very suitable solid adsorbent is active carbon, either as such or impregnated with solutions of chemical compounds which themselves are capable of reacting with hydrogen sulfide. Other suitable solid adsorbents are the oxides of certain metals, such as alumina, iron oxide and zinc oxide. More frequently use is made, however, of liquid absorbents. Well known absorbents of this type are aqueous solutions of alkanolamines, alkyl alkanolamines, morpholines, dimethyl formamide, amines, ammonia, alkali metal carbonates, combined or not combined with minor quantities of other compounds such as arsenic trioxide, selenic and/or telluric acid, potassium phosphate, sulfolane and the like. Use may also be made of solutions having an oxidizing nature, so that elemental sulfur is formed. These latter solutions generally consist of an absorbent for hydrogen sulfide containing a dissolved or suspended oxidant or catalyst. Suitable oxidants and/or catalysts are polythionates, iron oxide, thioaromatics, iron cyanide complexes, permanganates and dichromates.

The adorbents/absorbents used are preferably regenerable. Any hydrogen sulfide-containing gas liberated during regeneration may be recycled, for example, to the Claus plant.

The liquid and regenerable absorbent used is preferably an aqueous solution (1–3 molar) of an amine or a substituted amine, such as polyalkanolamines or alkaline metal salts of dialkyl-substituted amino acids. A solution of dipropanolamine is very suitable.

If active carbon is used as adsorbent, adsorption is preferably effected between 20°C and 150°C and at hourly space velocities of 750–2,000 Nl gas per liter of active carbon per hour.

The off-gases which have been freed from sulfur compounds by the process of the invention and which now consist predominantly of carbon dioxide and nitrogen in addition to minor quantities of hydrogen and traces of hydrogen sulfide may be discharged into the atmosphere. If desired, these off-gases may first be incinerated in a conventional manner before being passed to a stack.

Figure 2:
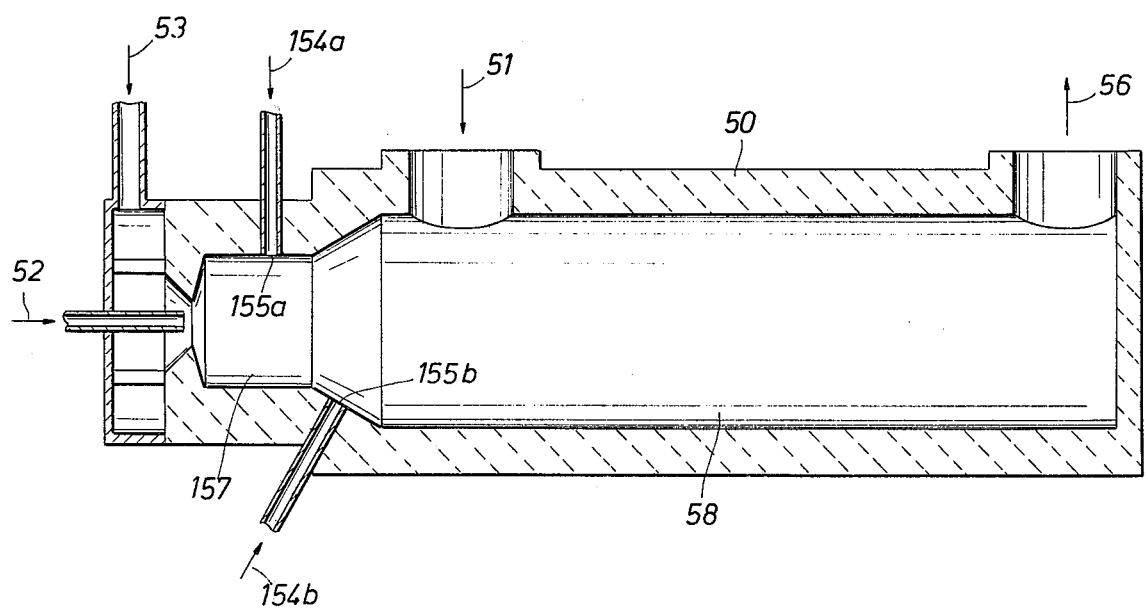

Referring now to the drawings, FIGS. 1 and 2 show alternative line burners which are suitable for introducing hydrogencontaining gas in the manner prescribed by the invention. With regard to FIGS. 2 and 3 substantially identical parts of the two line burners depicted are numbered with the same reference numerals. Hence 50 refers to the refractory lining of the line burner, 51 to the off-gases inlet to the line burner and 56 to the off-gases exit from the line burner. 52 refers to the fuel inlet and 53 to the oxygen-containing gas inlet to the burner. 58 refers to the mixing chamber of the line burner.

FIG. 1 depicts a line burner incorporating a conventional combustor or burner 57. The hydrogen-containing gas is introduced into the line burner either by an angled inlet 54 and nozzle 55a, situated near the mouth of the burner throat, or by inlet 54 and nozzle 55b situated in and perpendicular to the walls of the mixing chamber close to the mouth of the burner throat. It should be appreciated however that the introduction of the hydrogen-containing gas can be effected by one or more nozzles positioned at a variety of points situated in the vicinity of the burner throat and either being perpendicular to the walls of the line burner or at an angle to them. The positions indicated in this Figure are only two of many.

FIG. 2 depicts a line burner incorporating a high intensity combustor 157. The hydrogen-containing gas is either introduced into the line burner via inlet 154a and nozzle 155a into the combustion chamber of the high intensity combuster or via inlet 154b and nozzle 155b positioned close to the mouth of the combustion chamber.

We claim as our invention:

1. In a process for decreasing the total sulfur content of off-gases from a Claus process wherein the sulfur dioxidecontaining off-gases are heated to a temperature in excess of about 175°C by mixing with the hot gaseous product of the combustion of a carbonaceous fuel with an oxygen-containing gas in a line burner, and the Claus off-gases, so heated, are passed together with a hydrogen-containing gas over a reduction catalyst at a temperature above 175°C to reduce the sulfur dioxide and other convertible sulfur compounds present to hydrogen sulfide followed by removal of the hydrogen sulfide from the gaseous stream by adsorption on an absorbent or adsorbent for hydrogen sulfide, the improvement which comprises; introducing hydrogen-containing gas in a quantity which is required to convert at least 10 percent of the oxygen in the oxygen-containing gas supplied to the line burner directly into the line burner at a point where the temperature of the gaseous product of combustion is sufficiently high to support spontaneous combustion between the hydrogen and excess oxygen present in the combustion product.

2. The process of claim 1 wherein all of the hydrogen-containing gas required for catalytic reduction is introduced directly into the line burner at a point where the temperature of the gaseous product of combustion is sufficiently high to support spontaneous combustion between the hydrogen and excess oxygen present in the combustion product.

3. The process of claim 1 wherein the introduction of the hydrogen-containing gas into the line burner is affected by distributing it around the flame formed by the combustion of the carbonaceous fuel and the oxygen-containing gas.

* * * * *